United States Patent
Al-Mahshi

(10) Patent No.: US 10,808,778 B2
(45) Date of Patent: Oct. 20, 2020

(54) BRAKE SYSTEM

(71) Applicant: AKEBONO BRAKE INDUSTRY CO., LTD., Chuo-ku, Tokyo (JP)

(72) Inventor: Waleed Mahmoud Al-Mahshi, Farmington Hills, MI (US)

(73) Assignee: AKEBONO BRAKE INDUSTRY CO., LTD, Chuo-Ku, Tokyo (JP)

(*) Notice: Subject to any disclaimer, the term of this patent is extended or adjusted under 35 U.S.C. 154(b) by 113 days.

(21) Appl. No.: 16/106,501

(22) Filed: Aug. 21, 2018

(65) Prior Publication Data

US 2019/0063519 A1 Feb. 28, 2019

Related U.S. Application Data

(60) Provisional application No. 62/550,043, filed on Aug. 25, 2017.

(51) Int. Cl.
| | |
|---|---|
| *F16D 55/22* | (2006.01) |
| *F16D 55/226* | (2006.01) |
| *F16D 65/18* | (2006.01) |
| F16D 125/06 | (2012.01) |
| F16D 125/40 | (2012.01) |
| F16D 121/04 | (2012.01) |
| F16D 121/26 | (2012.01) |
| F16D 123/00 | (2012.01) |
| F16D 121/24 | (2012.01) |

(52) U.S. Cl.
CPC ....... *F16D 55/2262* (2013.01); *F16D 55/226* (2013.01); *F16D 65/18* (2013.01); *F16D 65/183* (2013.01); *F16D 2121/04* (2013.01); *F16D 2121/24* (2013.01); *F16D 2121/26* (2013.01); *F16D 2123/00* (2013.01); *F16D 2125/06* (2013.01); *F16D 2125/40* (2013.01)

(58) Field of Classification Search
CPC .... F16D 65/66; F16D 55/2262; F16D 55/226; F16D 65/18; F16D 65/183; F16D 2121/04; F16D 2121/24; F16D 2121/26; F16D 2123/00; F16D 2125/06; F16D 2125/40; F16D 2125/20
USPC ....................................................... 188/71.9
See application file for complete search history.

(56) References Cited

U.S. PATENT DOCUMENTS

| | | | | |
|---|---|---|---|---|
| 3,770,082 A | * | 11/1973 | Brooks ................. | F16D 65/567 188/71.9 |
| 3,900,084 A | * | 8/1975 | Farr ........................ | F16D 65/18 188/196 F |
| 4,050,553 A | * | 9/1977 | Pollinger ................ | F16D 65/66 188/203 |
| 4,119,188 A | * | 10/1978 | Argereu ............... | B65H 54/543 188/185 |
| 5,788,023 A | | 8/1998 | Schöner et al. | |
| 8,371,588 B2 | | 2/2013 | Kohlhauser et al. | |

(Continued)

FOREIGN PATENT DOCUMENTS

GB 446339 A * 4/1936 ............. F16D 65/22

*Primary Examiner* — Melanie Torres Williams
(74) *Attorney, Agent, or Firm* — The Dobrusin Law Firm, P.C.; Bryan S. Lemanski

(57) ABSTRACT

A brake system that includes a brake piston and a spindle. The brake piston includes a piston pocket defined in the brake piston. The piston pocket includes a threaded portion. The spindle includes a threaded portion. The threaded portion of the spindle is adapted to threadably engage the threaded portion of the piston pocket.

17 Claims, 4 Drawing Sheets

(56) References Cited

U.S. PATENT DOCUMENTS

| | | | |
|---|---|---|---|
| 9,333,953 B2 | 5/2016 | Masuda et al. | |
| 9,476,489 B2 | 10/2016 | Funada et al. | |
| 2015/0300433 A1* | 10/2015 | Yasui | F16D 65/18 188/162 |
| 2017/0106848 A1* | 4/2017 | Ritter | F16D 65/18 |
| 2018/0231081 A1* | 8/2018 | Chelaidite | F16D 65/183 |

* cited by examiner

BRAKE SYSTEM

CROSS-REFERENCE TO RELATED APPLICATION

This application claims the benefit of U.S. Provisional Application No. 62/550,043, filed Aug. 25, 2017 the entire contents of which is hereby incorporated by reference herein.

FIELD

These teachings relate to a brake system, and more particularly to a brake piston and a brake system.

BACKGROUND

A brake system typically includes a brake caliper configured to support at least one brake piston. The brake piston is adapted to move at least one brake pad into contact with a moving component to create a clamping force. The clamping force may be used to slow, stop, or prevent movement of the moving component. In vehicular applications, the moving, component may be a brake rotor.

In some applications, the brake system may comprise a motor and a rotary to linear stage mechanism. The rotary to linear stage mechanism may be adapted to convert torque from the motor into a linear force to move the brake piston and the brake pad into contact with the moving component to create the clamping force.

A typical rotary to linear stage mechanism comprises a spindle and a nut. The spindle is in rotational communication with the motor, and the nut is threadably engaged with the spindle. To create the clamping force, the spindle is rotated via the motor in an apply direction, which causes the nut to axially move in an apply direction until the nut contacts a bottom pocket wall of the brake piston. After contact is made, continued rotation of the spindle in the apply direction causes the nut to push the brake piston in an apply direction until the brake piston contacts a brake pad. Continued rotation of the spindle causes the brake piston to push the brake pad into contact with the moving component thus creating the clamping force.

While such systems may be satisfactory for creating clamping force, improvements may be desired.

For example, in some applications, it may be desirable to reduce the number of components in a brake system to reduce cost, complex, weight, and/or packaging space. It may also be desirable to reduce the number of parts in such a brake system to simplify manufacturing and assembly of the system. Moreover, by reducing the number of components in a brake system, tolerance variations in the system may be reduced, which may improve overall system performance.

It may further be desirable to improve a brake system to improve response time in creating the clamping force. For example, in some applications, a lag time may be realized between the time when the motor begins rotating the spindle to when the nut takes up a gap defined between the nut and the bottom pocket wall of the brake piston and then begins to actually move the brake piston and the brake pad against the moving component to create the clamping force, in some braking applications, it may be desirable to reduce or eliminate this lag time so that the brake piston and the brake pad can be moved when the motor begins rotating the spindle.

Some examples of brake systems are found in U.S. Pat. Nos. 8,371,588; 9,333,953; and 9,476,489, all of which are incorporated by reference herein.

SUMMARY

These teachings provide a brake system and a brake piston. The brake piston includes a piston body that extends along a longitudinal axis. The longitudinal axis may be the axis of the piston body and/or an axis of a caliper bore into which the piston body is received. A piston pocket is formed or defined in the piston body. The piston pocket includes a threaded portion that is adapted to directly, threadably engage a threaded portion of a spindle rotation of the spindle causes the brake piston to move axially along the longitudinal axis as soon as the spindle is rotated.

Some known brake systems and/or brake pistons include a nut or other sliding member provided between the spindle and the brake piston. During use of such a system that includes a nut, the spindle is rotated, which causes the nut to axially move along a length of the spindle until the nut contacts the brake piston. Further rotation of the spindle causes the nut to eventually contact and then push the brake piston. Accordingly, a lag time may be realized between the time when the spindle is rotated and when the nut actually contacts the brake piston and then beings to move the brake piston.

In contrast, and advantageously, the brake system according to these teachings is free of a nut or similar sliding member provided between the spindle and the brake piston. Instead, the spindle is directly, threadably connected to the brake piston. Rotation of the spindle directly causes the brake piston to move. Accordingly, without such a nut or sliding member, the number of parts in such the brake piston and/or brake system is reduced, which advantageously results in reduced cost, complex, weight, and packaging space. Moreover, by eliminating the nut, the number of parts in such a bake piston and/or brake system are reduced, which advantageously results in simplified manufacturing and assembly. Furthermore, by eliminating the nut, an increase in response time can be achieved in creating the clamping force because as soon as the spindle is rotated, the brake piston begins to axially move rather than waiting for a gap between the nut and bottom pocket wall to be taken up.

An outer surface of the brake piston according to the teachings herein comprises one or more anti-rotation features. The one or more anti-rotation features of the brake piston are configured to be engaged by one or more corresponding anti-rotation features defined in a caliper bore of a brake caliper. The anti-rotation features of the brake piston and brake caliper cooperate to restrict or prevent the brake piston from rotating about its longitudinal axis when the spindle is rotated; however, still allow for the brake piston to axially move axially along its longitudinal axis in an apply and release direction.

The brake piston and/or system according to the teachings herein also includes a piston seal with corresponding anti-rotation features that are adapted to engage the anti-rotation feature of the brake piston. The piston seal is adapted to advantageously maintain parallelism of the brake piston inside the caliper bore.

These teachings provide a brake system that includes a brake piston and a spindle. The brake piston includes a piston pocket defined in the brake piston. The brake piston or piston pocket includes a threaded portion. The spindle also includes a threaded portion. The threaded portion of the spindle is adapted to threadably engage the threaded portion of the piston pocket.

These teachings also provide a brake system comprising a brake piston, a spindle, and a piston seal. The brake piston comprises an outer surface having an anti-rotation feature. The brake piston comprises a piston pocket. The piston pocket comprises a threaded portion. The spindle comprises a threaded portion. The threaded portion of the spindle is adapted to threadably engage the threaded portion of the piston pocket. The spindle is in communication with a motor that is adapted to generate torque, which causes the spindle to rotate. The piston seal surrounds the outer surface of the brake piston. The piston seal comprises a generally annular structure that comprises one or more anti-rotation features. The anti-rotation feature of the piston seal is adapted to engage the anti-rotation feature of the brake piston. The brake piston is adapted to be received in a caliper bore of a brake caliper. The caliper bore comprises an anti-rotation feature that is adapted to engage the anti-rotation feature of the brake piston so that the brake piston is restricted from rotating within the caliper bore when the spindle is rotated by the motor.

These teachings also provide a brake system comprising a brake piston, a spindle, and a piston seal. The brake piston comprises a generally circular outer surface having at least one flat surface. The brake piston comprises piston pocket, the piston pocket comprises a threaded portion. The spindle comprises a threaded portion, that is adapted to threadably engage the threaded portion of the piston pocket. The spindle is in communication with a motor that is adapted to rotate the spindle. The piston seal surrounds the outer surface of the brake piston. The piston seal comprises a generally annular structure that comprises at least one flat surface disposed on an inner diameter thereof. The at least one flat surface of the piston seal is adapted to engage the at least one flat surface of the brake piston. The brake piston is adapted to be received in a caliper bore of a brake caliper. The caliper bore comprises at least one flat surface that is adapted to engage the at least one flat surface of the brake piston so that the brake piston is restricted from rotating within the caliper bore when the spindle is rotated by the motor.

DETAILED DESCRIPTION

Figure 1:
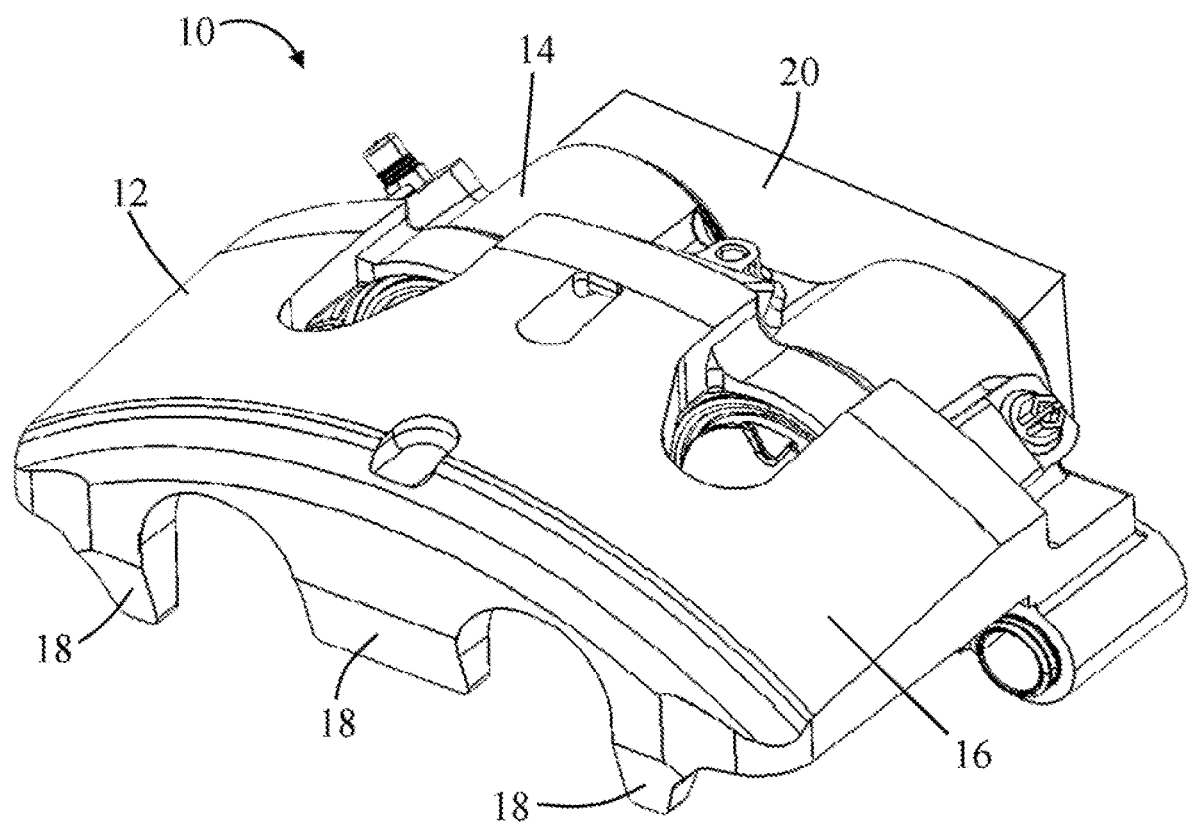
FIG. 1 is a perspective view of a brake system.

The brake assembly may be any system or assembly for creating a clamping force. The brake system may function to create a clamping force to slow, stop, and/or maintain a moving component, such as a brake rotor or a road wheel of a vehicle, in a stopped or parked position. The brake system may function to release the clamping force so that the moving component, such as the brake rotor or the road wheel of the vehicle, can move.

The brake system may be an opposing brake system (i.e., a fixed caliper brake system) or a floating brake system (i.e., a floating caliper). The brake system may be a disc brake system. The brake system may be used as a service brake to slow, stop, and/or maintain a brake rotor, a road wheel, or a vehicle, in a stopped position. The brake system may be used as a parking brake to maintain a brake rotor, a road wheel, or a vehicle, in a parked position.

Clamping force may be any force that, when coupled with a brake pad coefficient of friction, functions to decelerate, slow, stop, and/or prevent movement or rotation of a moving component. The clamping force may be created during a standard brake apply or application of the service brake (i.e., a brake apply force) to slow, stop, or prevent movement of a moving component, a brake rotor, a road wheel, or vehicle. The clamping force may be created during a parking brake apply (i.e., a parking brake force) to prevent or restrict movement of a stopped or parked moving component, brake rotor, road wheel, or vehicle.

The brake system may comprise a brake caliper. The brake caliper may function to support one or more the components of the brake system. For example, the brake caliper may comprise one or more supports for engaging and/or supporting one or more brake pads. The brake caliper may comprise one or more caliper bores for supporting one or more brake pistons. For example, the brake caliper may comprise one or more features for supporting an MGU or electric motor.

The brake caliper may move during a brake apply (i.e., a floating caliper), or the brake caliper may be fixed so that the brake caliper does not move during a brake apply (i.e., a fixed caliper). The brake caliper may be connected or mounted to any non-rotating or moving part of a machine, structure, or vehicle, like a knuckle or a spider of a vehicle, which may be the casting that a disc brake system is mounted to.

The brake caliper may comprise one or more caliper bores. A caliper bore may be a hollow region, pocket, bore, or through-bore defined in the brake caliper that is configured or adapted to receive and support a corresponding brake piston. A brake caliper may have one caliper bore. A brake caliper may have more than one caliper bores. All of the caliper bores may be located on one side of the brake caliper or brake rotor. Some of the caliper bores may be located on one side of the brake caliper or brake rotor, and some of the caliper bores may be located on an opposite side of the brake rotor or brake rotor. One or more of the caliper bores can be located on only one side of the moving component or brake rotor (i.e., either the inboard side or the outboard side), or one or more caliper bores can be located on both sides of the moving component or brake rotor (i.e., both of the inboard side and the outboard side).

Each caliper bore may comprise one or more anti-rotation features. The one or more anti-rotation features of the caliper bore may function to restrict or prevent the brake piston from rotating about a longitudinal axis of the brake piston or caliper bore. The one or more anti-rotation features of the caliper bore may function to restrict or prevent the brake piston from rotating about the longitudinal axis of the brake piston or caliper bore when the spindle is rotated. The one or more anti-rotation features of the caliper bore may cooperate with and/or engage one or more corresponding anti-rotation features defined on Outer surface of the brake piston; may cooperate with and/or engage the piston seal; may cooperate with and/or engage any other portion of the brake piston, to restrict or prevent the brake piston from rotating. The one or more anti-rotation features of the caliper bore may cooperate with and or engage one or more corresponding anti-rotation features defined on outer surface of the brake piston to maintain the brake piston in a particular position for example, to maintain parallelism or squareness of the brake piston inside the caliper bore. The one or more anti-rotation features of the caliper bore may cooperate with and/or engage the piston seal, which may cooperate with and/or engage one or more corresponding anti-rotation features defined on outer surface of the brake piston to maintain parallelism or squareness of the brake piston inside the caliper bore. The one or more anti-rotation features of the caliper bore may cooperate with and/or engage the piston seal, which may cooperate with and/or engage one or more corresponding anti-rotation features defined on outer surface of the brake piston to maintain the longitudinal axis of the brake piston in a co-linear relationship with the longitudinal axis of the caliper bore.

The one or more anti-rotation features of the caliper bore may be located on one or on more portions, sections, surfaces, or features of a caliper bore. For example, the one or more anti-rotation features of the caliper bore may be located along a single plane that is generally perpendicular to a longitudinal axis of the caliper bore. The one or more anti-rotation features of the caliper bore may be located along an entire length of depth of the caliper bore, or only along a selected portion thereof.

The one or more anti-rotation features of the caliper bore may comprise substantially flat sections or linear surfaces relative to the circular diameter of the caliper bore. The flat sections or linear surfaces may be a tangent line, plane, or surface to the circular outer diameter of the caliper bore. The one or more anti-rotation features of the caliper bore may have other geometry, such as, for example, a toothed or notched geometry. The one or more anti-rotation features may include areas with increased coefficient of friction relative to the rest of the circular outer surface or diameter of the caliper bore. The one or more anti-rotation features may include bumps, nubs, notches, grooves, texture, or a combination thereof that function to engage or contact other corresponding anti-rotation features to prevent the brake piston from rotating, while along the brake piston to axially move along a longitudinal axis.

The one or more anti-rotation features of the caliper bore may be substantially the same as or compliment the one or more anti-rotation features of the brake piston and/or the one or more anti-rotation features of the piston seal.

The brake system may comprise one or more brake pistons. The one or more brake pistons may function to move a brake pad, or a corresponding end of brake pad towards a moving component or brake rotor to create the clamping force. The one or more brake pistons may function to move away from a brake pad, or a corresponding end of brake pad so that the brake pad or the corresponding end of a brake mad moves away from a moving component or brake rotor to release the clamping force.

The one or more brake pistons can be mechanically moved, for example, by moving or rotating a corresponding spindle. The one or more brake pistons may be moved with the torque generated by the motor, which is then transferred or supplied to the brake piston via a corresponding spindle. Because the spindle is threadably engaged directly to the brake piston, movement of the spindle results in direct and generally immediate movement of the brake piston, either towards or away from the brake pad, depending on the direction of rotation of the spindle (e.g., clockwise vs. counterclockwise/apply vs. release direction). The one or more brake pistons according to the teachings herein are free from being moved by pressurizing a fluid, like hydraulic fluid. Thus, to create a clamping force whether during application of the service brake or application of the parking brake, the brake piston is moved by moving the spindle. However, a fluid may be supplied to the one or more brake pistons to lubricate the components thereof, for example, the threaded portions of the brake piston and spindle.

Each brake piston comprises a piston pocket. The piston pocket may be a cup, recess, or a hollow portion formed into an end of a brake piston. The piston pocket may be a through hole that extends from one end of the brake piston through to the other end of the brake piston. The piston pocket may be adapted to directly receive and engage at least a portion of a corresponding spindle.

The piston pocket may comprise a threaded portion. The threaded portion of the piston pocket may function to threadably engage the threaded portion on the spindle. The threaded portion may be integrally formed into the piston pocket. Alternatively, the threaded portion may be part of a sleeve that is press-fit and/or otherwise mechanically locked or bonded to the piston pocket so that the threaded portion and the brake piston are generally a single, monolithic structure.

The one or more anti-rotation features of the brake piston may function to restrict or prevent the brake piston from rotating about a longitudinal axis of the brake piston and/or caliper bore. The one or more anti-rotation features of the brake piston may function to restrict or prevent the brake piston from rotating about the longitudinal axis of the brake piston and/or caliper bore when the spindle is rotated. The one or more anti-rotation features of the brake piston may cooperate with and/or engage one or more corresponding anti-rotation features defined on the inner surface of the caliper bore to restrict or prevent the brake piston from rotating but allow for the brake piston to move axially along a longitudinal axis of the caliper bore or brake piston.

The one or more anti-rotation features of the brake piston may cooperate with and/or engage one or more corresponding anti-rotation features defined in the caliper bore to maintain the brake piston in a particular position—for example, to maintain parallelism or squareness of the brake piston inside the caliper bore. The one or more anti-rotation features of the brake piston may cooperate with and/or engage the one or more corresponding anti-rotation features of the piston seal, which may cooperate and/or engage the caliper bore to maintain parallelism or squareness of the brake piston inside the caliper bore.

The one or more anti-rotation features of the brake piston may be located on one or on more portions, sections, surfaces, or features of a brake piston. For example, the one or more anti-rotation features of the brake piston may be located along a single plane that is generally perpendicular to a longitudinal axis of the brake piston. The one or more anti-rotation features of the brake piston may be located along an entire length of the brake piston, or only along a selected portion thereof.

The one or more anti-rotation features of the brake piston may be substantially flat or linear surfaces. The one or more anti-rotation features of the brake pistons may be flat or tangent surfaces relative to the rest of the circular outer circumference of the brake piston. The flat sections or linear surfaces of the brake piston may be a tangent line, plane, or surface to the circular outer diameter of the caliper bore. The one or more anti-rotation features of the brake piston may have other geometry, such as, for example, a toothed or notched geometry. The one or more anti-rotation features of the brake piston may have other geometry, such as, for example, a toothed or notched geometry. The one or more anti-rotation features may include areas with increased coefficient of friction relative to the rest of the outer surface of the brake piston. The one or more anti-rotation features may include bumps, nubs, notches, grooves, texture, or a combination thereof that function to engage or contact other corresponding anti-rotation features to prevent the brake piston from rotating, while along the brake piston to axially move along a longitudinal axis. The one or more anti-rotation features of the brake piston may be substantially the same as or match the one or more anti-rotation features of the caliper bore and/or piston seal.

The one or more anti-rotation features of the brake piston and/or caliper bore may be of the ones disclosed in Applicant's U.S. patent application Ser. No. 15/797,172 filed on Oct. 30, 2017, the disclosure of which is hereby incorporated by reference herein for all purposes. For example, referring to Applicant's U.S. patent application Ser. No. 15/797,172, the anti-rotation features may be one or more of the clips 132, 134, O-ring 234, and the corresponding groove 124 or 224 defined in the piston pocket.

The one or more anti-rotation features of the brake piston, the piston seal, the caliper bore, or a combination thereof may function to restrict or prevent the brake piston from rotating about a longitudinal axis of the brake piston and/or caliper bore during a condition when the spindle is rotated but before the brake piston contacts the brake pad. After the brake piston contacts the brake pad, the one or more anti-rotation features of the brake piston, the piston seal, the caliper bore, or a combination thereof may or may not continue to restrict or prevent the brake piston from rotating about its longitudinal axis when the spindle is rotated.

The face or forward surface of the brake piston may contain a feature that is configured to contact and/or engage a corresponding feature on the pressure plate of the corresponding brake pad to restrict or prevent the brake piston from rotating about its longitudinal axis while the spindle is rotated. The one or more features may be, for example, a textured or hatched portion, one or more bumps, nubs, grooves, projections, or a combination thereof. Therefore, the one or more anti-rotation features of the brake piston, the piston seal, the caliper bore, or a combination thereof need only to restrict or prevent the brake piston from rotating up until a time the brake piston contacts the brake rotor. After that, the one or more anti-rotation features of the brake piston, the piston seal, the caliper bore, or a combination thereof may continue to restrict or prevent the brake piston from rotating but do not need to because of the one or more features between the face of the brake piston and the pressure plate of the brake pad that function to restrict or prevent the brake piston from rotating when the spindle is rotated.

The brake system may comprise one or more rotary to linear stage mechanisms. A rotary to linear stage mechanism may function to transfer or convert torque from the motor or MGU into a linear or axial force to axially move a brake piston.

The rotary to linear stage mechanism may be a high-efficiency device. An example of a high-efficiency device is a ball screw. The high efficiency device is a device that is more efficient than a low efficiency device. Efficiency may refer to how well, or how "efficiently" the device converts or transfers torque from a motor or MGU into a linear load or output force. Depending on one or more considerations, such as lead angle and coefficient of fiction, the one or more high efficiency devices may have an efficiency on the order of approximately 60% or more, approximately 70% or more, approximately 80% or more, approximately 85% or more, approximately 90% or more, approximately 95% or more, 97% or more, or even 99% or more. The rotary to linear stage mechanism may be a low-efficiency device. An example of a low-efficiency device is a lead screw.

Each of the one or more rotary to linear stage mechanisms comprise the brake piston disclosed herein and a corresponding spindle. The rotary to linear stage mechanism may be defined at or as the threaded portion of the brake piston and the corresponding threaded portion of the spindle. The rotary to linear stage mechanism according to these teachings is free of a nut that is threaded onto the spindle instead, the brake piston directly threadably engages the spindle. One or more rollers or ball bearings or other load transferring members may be located between the brake piston and the spindle. For example, ball bearings may be located in a track defined by the threaded portion of the spindle and the corresponding threaded portion of the brake piston.

Because it is a high-efficiency mechanism, a sufficient brake or other low efficiency mechanism may be required to maintain the clamping force after it is created in order to prevent the high-efficiency system from back driving. That is, after the clamping force is created, a sufficient brake is required in order to prevent the spindle from rotating within the brake piston in an opposing release direction due to the opposing reaction force of the clamping force acting on the brake piston.

The rotary to linear stage mechanism or the high efficiency device according to these teachings may be a ball screw or a roller screw for example. Exemplary ball screws may utilize ball bearings as load transfer elements between the threaded portion of the spindle and the threaded portion of the brake piston. During rotation of the spindle, the ball bearings may circulate along races or grooves between the threaded portions of the spindle and brake piston. A roller screw or planetary screw may be similar to a ball screw except that roller screws use rollers as the load transfer elements between spindle and the brake piston. The load is distributed over a large number of ball bearings or rollers, via roller threads, respectively, so that each ball bearing or roller, when subjected to force, may roll, and therefore, friction is reduced, which may equate to high efficiency. Accordingly, less force or torque may be required to move the spindle and piston in an apply direction, a release direction, or both. However, the one or more rotary to linear stage mechanisms may be a low-efficiency device.

The brake system may comprise one or more spindles. A spindle may include threaded portion and an input portion. The threaded portion may threadably engage the threaded portion of a brake piton. The input portion may engage or be engaged by a motor or MGU or other transfer gear to rotate the spindle. The spindle may be rotated about an axis that is the same as or collinear with a longitudinal axis of the brake piston and/or caliper bore. The spindle may be rotated in an apply direction to develop or generate clamping force and in a release direction to release the clamping force. The apply direction may be clockwise, and the release direction may be counter-clockwise, or vice versa.

The brake system and/or the brake piston and/or the rotary to linear stage mechanism may be free of a nut. This means that there is no nut or other sliding or pushing member provided between the spindle and brake piston. This means the brake system and/or the brake piston and/or the rotary to linear stage mechanism is free of a nut that threadably engages the threaded portion of the spindle. Instead, the spindle is configured to directly contact and engage the brake piston. More specifically, the threaded portion of the spindle is configured to directly threadably engage the threaded portion of the brake piston or piston pocket. The spindle is thus configured to directly move or push the brake piston against the brake pad and then move or push the brake pad against the brake rotor to create and/or maintain the clamping force required to slow, stop, or prevent movement of the brake rotor or road wheel of a vehicle. Conversely, in systems that comprise a nut that threadably engages the spindle, the spindle is configured to move the nut, and the nut is configured to contact and then move or push the brake piston and then the brake pad against the brake rotor to create or generate clamping force. By having a system that is free of a nut, a lag time between when the spindle is rotated to when the brake piston is actually moved is reduced or eliminated. This is because the brake system no longer has to wait for the gap between the nut and the bottom of the piston pocket to be taken up (i.e., no longer has to wait for the nut to be moved into contact with the brake piston) before the brake piston is actually moved or pushed with the nut when the spindle is rotated. Instead, when the spindle is rotated, the brake piston is moved axially along the longitudinal axis.

The brake system and/or the brake piston may comprise one or more piston seals. The piston seal may function to restrict or prevent the brake piston from rotating in the caliper bore about its longitudinal axis when the spindle is rotated. The piston seal may function to maintain a centered position of the brake piston relative to the caliper bore. The piston seal may function to maintain parallelism and/or squareness of the brake piston within the caliper bore. The piston seal may function to maintain a longitudinal axis of the brake piston collinear with or the same as the longitudinal axis of the caliper bore.

The piston seal may surround an outer surface of the brake piston. The piston seal may be located in a groove, notch, or cutout defined in the caliper bore. The piston seal may be sandwiched between the brake piston and the caliper bore. The piston seal may have a generally circular, annular shape, and may be formed of a rubber or similar playable material.

An inner diameter or surface of the annular piston seal may comprise one or more anti-rotation features. The one or more anti-rotation features of the piston seal may cooperate with and/or engage one or more corresponding anti-rotation features defined on the outer surface of the brake piston to maintain the brake piston in a particular position—for example, to maintain parallelism or squareness of the brake piston inside the caliper bore.

The one or more anti-rotation features of the piston seal may be located on one or on more portions, sections, surfaces, or features of a piston seal. The one or more anti-rotation features of the piston seal may be substantially flat or linear sections or surfaces. The one or more anti-rotation features of the piston seal may be flat or tangent surfaces relative to the rest of the circular or annular piston seal. The one or more anti-rotation features of the piston seal may have other geometry, such as, for example, a toothed or notched geometry. The one or more anti-rotation features of the piston seal may have other geometry, such as, for example, a toothed or notched geometry. The one or more anti-rotation features may include areas with increased coefficient of friction. The one or more anti-rotation features may include bumps, nubs, notches, grooves, texture, or a combination thereof that function to engage or contact other corresponding anti-rotation features to prevent the brake piston from rotation, while along, the brake piston to axially move along a longitudinal axis. The one or more anti-rotation features of the piston seal may be substantially the same as or match the one or more anti-rotation features of the caliper bore and/or brake piston.

The brake system may comprise one or more brake pads. Each brake pad includes a friction material and a pressure plate. The one or more brake pads may be supported on the brake caliper so that the friction material faces a side of the moveable member or brake rotor. The pressure plate may oppose the friction surface. One or more brake pistons, or one or more brake caliper fingers, may contact the pressure plate of a corresponding brake pad. For example, in some cases, one or more brake pistons may be in contact with the pressure plate of an inboard brake pad, and one or more brake caliper fingers may be in contact with the pressure plate of an outboard brake pad. In some cases, one or more brake pistons may be in contact with the pressure place of an inboard brake pad, and one or more brake pistons may be in contact with the pressure place of an outboard brake piston. During a brake apply, or while applying the parking brake, the one or more brake pistons and/or the one or more fingers can move all or an end of a corresponding brake pad so that the corresponding friction material engages a corresponding side of the moveable member or brake rotor to create the clamping force.

The brake system may cooperate with a moveable member to create the clamping force. The moveable member may be any moveable part. In vehicular applications, the moveable member may be a brake rotor. The brake rotor is the rotating pan the brake assembly, against which one or more of the brake pads are moved or applied to create the clamping force.

The brake system may include a motor gear unit (MGU). The MGU may function to create or generate a force or torque, and then transfer the force or torque to one or more components of the brake system to create, increase, decrease, and/or release the clamp force. The MGU may function to generate torque sufficient to move the one or more rotary to linear stage mechanisms, the one or more brake pistons, the one or more brake pads, or a combination thereof toward the brake rotor to create drag with the one or more brake pads against the brake rotor, which acts to develop the clamping force. The MGU may function to generate torque that is sufficient to move the one or more rotary to linear stage mechanisms, the one or more brake pistons, or both away from the one or more brake pads so that the brake pads move away from the brake rotor so that the drag is reduced or eliminated to release the clamping force.

The MGU may be any device or combination of devices that may perform one or more of the aforementioned functions. For example, the MGU may include a motor that generates torque. For example, the motor may be a DC motor, a brushless motor, a series-wound motor, a shunt wound motor, a compound wound motor, a separately exited motor, a servomotor, a stepping motor, or a permanent magnet motor. The MGU may include one or more gears or gear trains that may function to transfer, increase, and/or decrease the torque output of the motor. The MGU may or may not include a lock or brake to prevent back driving of the one or more rotary to linear stage mechanisms after the clamp force is created and after the MGU is turned. OFF or disconnected. For example, the MGU may include a wrap spring, solenoid, or other mechanism to maintain the clamp force after the MGU is turned OFF or is disconnected.

FIG. 1 illustrates a brake system 10. The brake system 10 comprises a caliper body 12. The caliper body 12 comprises a brake piston supporting section 14, a bridge 16, and fingers 18. The brake system 10 comprises a motor gear unit (MGU), which is schematically illustrated at 20.

Figure 2:
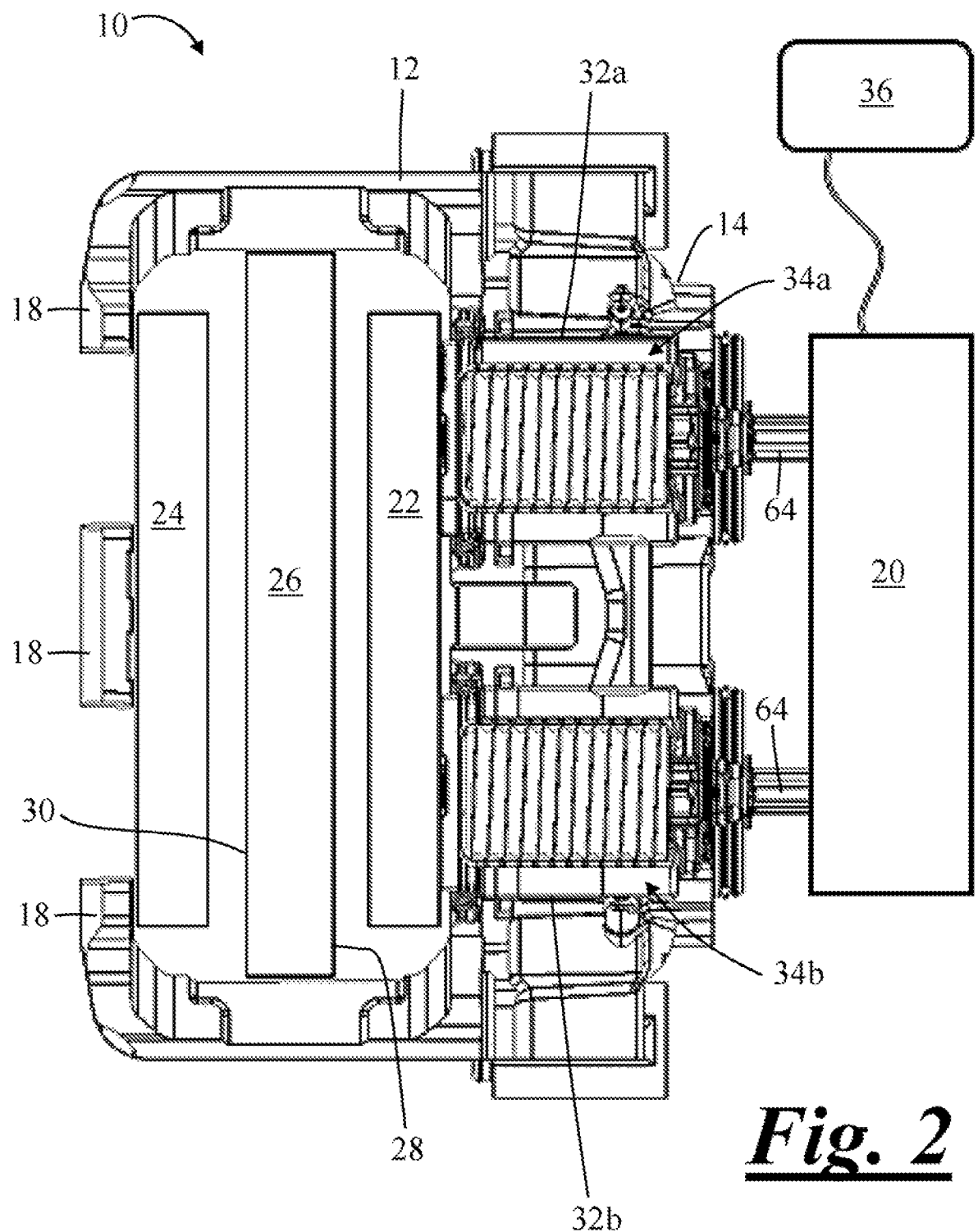
FIG. 2 is a cross-sectional view of the brake system according to FIG. 1.

FIG. 2 illustrates the brake system 10. The caliper body 12 is adapted to support an inboard brake pad, which is schematically illustrated at 22 and is located adjacent the brake piston supporting section 14. The caliper body 12 is adapted to support an outboard brake pad, which is schematically illustrated at 24 and is located adjacent the fingers 18. A brake rotor, illustrated schematically at 26, is supported in between the inboard and outboard brake pads 22, 24, and comprises an inboard braking surface 28 facing the inboard brake pad 22, and an outboard braking surface 30 facing the outboard brake pad 24.

With continued reference to FIG. 2, at the brake piston supporting section 14, the brake system 10 comprises a pair of caliper bores 32a, 32b. It is understood, however, that the brake system 10 can comprise any number of caliper bores 32a, 32b, including one caliper bore, or even three or more caliper bores. In addition, or alternatively, it is also understood that the brake system 10 can comprise any number of caliper bores located at the other side of the brake rotor 26. In other words, while the brake system 10 illustrated in FIGS. 1 and 2 is a sliding type of brake system 10, the brake system may instead be an opposed piston brake system. In other words, while the brake system 10 illustrated in FIGS. 1 and 2 shows only caliper bores at the inboard side, the brake system 10 may have caliper bores only at the outboard side.

The brake system 10 comprises a brake piston 34a, 34b supported in each caliper bore 32a, 32b. The brake system 10 comprises a controller 36 that may be in communication with the MGU 20.

Figure 3:
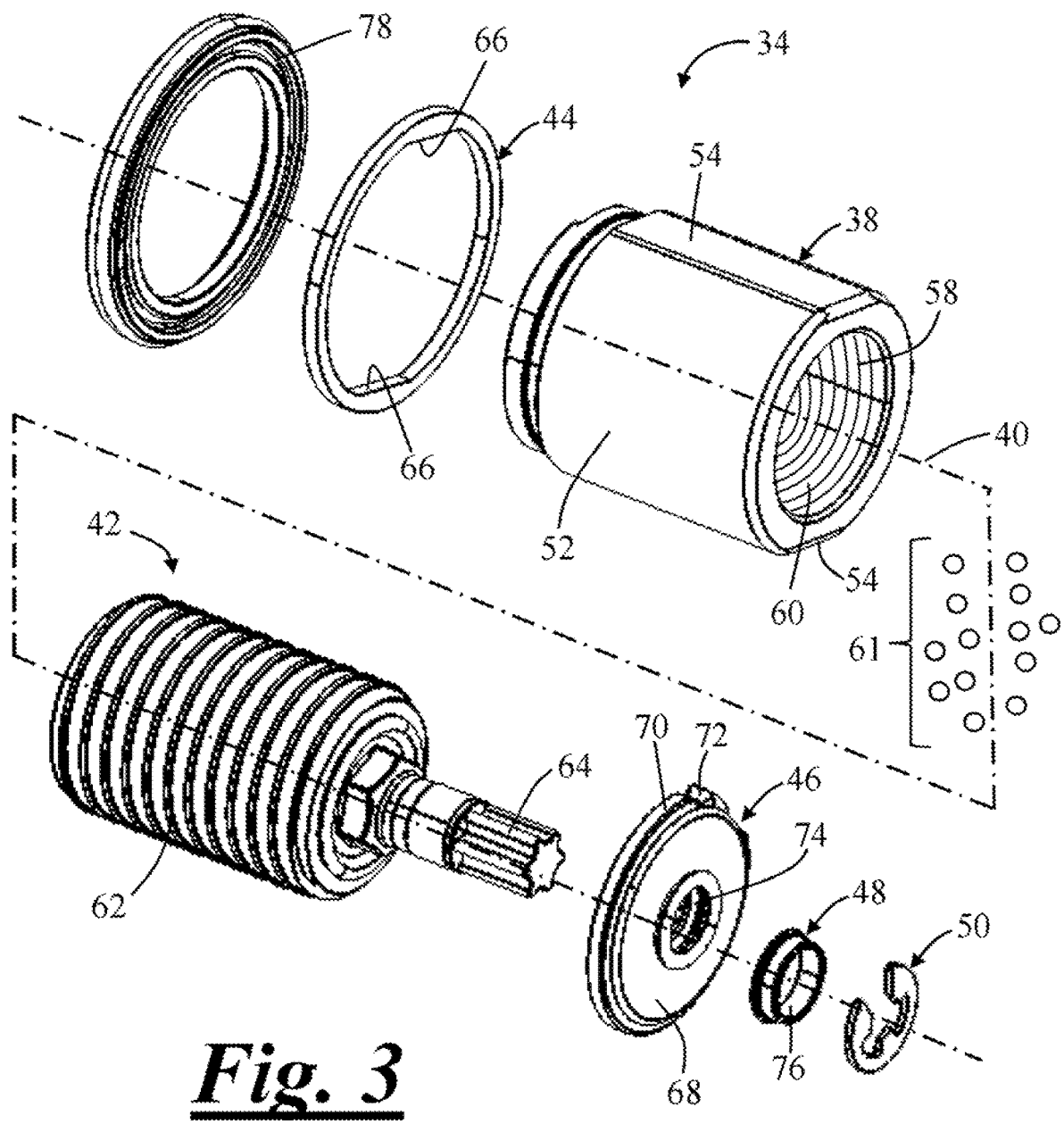
FIG. 3 is an exploded, perspective view of a brake piston.

FIG. 3 illustrates the brake piston 34, which may be one or both of the brake pistons 34a, 34b illustrated in FIG. 2. The brake piston 34 comprises a piston body 38, which extends along a longitudinal axis 40; a spindle 42; a piston seal 44; a thrust bearing assembly 46; a spindle O-ring 48; and a retaining clip 50.

An outer surface 52 of the piston body 38 comprises a pair of anti-rotation features 54 that generally oppose one another. Stated another way, the anti-rotation features 54 are located on opposing sides of the piston body 38. However, in some configurations, the piston body 38 may include only one anti-rotation feature 54. However, in some configurations, the piston body 38 may include more than two anti-rotation features 54. In configurations where the piston body 38 includes two or more anti-rotation features 54, the anti-rotation features may be equally spaced around the piston body 38 or unequally spaced around the piston body 38.

The outer surface 52 of the piston body 38 is generally circular, and the anti-rotation features 54 are generally flat sections relative to the generally circular outer surface 52. The anti-rotation features 54 of the brake piston 38 are adapted to engage or be engaged by corresponding anti-rotation features 56 (FIG. 4) defined in the caliper bore 32 of the caliper body 12.

The caliper bore 32 is also generally circular, and the anti-rotation features 56 of the caliper bore 32 are generally flat sections relative to the generally circular caliper bore 32. The anti-rotation features 54, 56 cooperate to restrict or prevent the brake piston 34 from rotating inside the caliper bore 32 about the axis 40. For example, the anti-rotation features 54, 56 cooperate to restrict or prevent the brake piston 34 from rotating inside the caliper bore 32 about the axis 40 when the spindle 42 is rotated by the MGU 20.

The piston body 38 comprises a piston pocket 58. The piston pocket 58 is a bore or pocket or cup or absence of material defined in the piston body 38. The piston pocket 58 comprises a threaded portion 60 that is defined or formed directly in or on the inside annular wall or side wall defining the piston pocket 58. Alternatively, the threaded portion 60 may be a sleeve or insert that is tit into the piston pocket 58. The threaded portion 50 is adapted to directly, threadably engage a corresponding threaded portion 62 of the spindle 42.

The spindle 42 comprises a threaded portion 62 that is configured to directly, threadably engage the threaded portion 60 of the piston body 38. One or more ball bearings or rollers 61 may be located in grooves, channels, or races defined by the corresponding threaded portions 60, 62 so that the spindle 42 and the piston body 38 function like a high-efficiency rotary to linear motion mechanism, for example a ball screw. However, in some configurations, the system may be free of any ball bearings or rollers located in grooves, channels, or races defined by the corresponding threaded portions 60, 62. In such configurations, the spindle 42 and the piston body 38 may function like a low-efficiency rotary to linear motion mechanism, for example a lead screw.

The spindle comprises an input portion 64. The input portion 64 of the spindle 42 is adapted to directly or indirectly (via one or more gears) engage the MGU 20 (FIG. 2) so that when the MGU 20 generates torque, the torque is transmitted to the input portion 64 of the spindle 42 so that the spindle 42 is rotated about the longitudinal axis 40. As will be discussed further below, rotation of the spindle 42 about the longitudinal axis 40 causes the brake piston 32 to move axially along the longitudinal axis 40.

The piston seal 44 is a generally annular structure that is adapted to tit around and surround the outer surface 52 of the piston body 38. The piston seal 44 comprises anti-rotation features 66 disposed around an inner diameter thereof. The anti-rotation features 66 generally correspond to and are adapted to engage the corresponding anti-rotation features 54 located on the outer surface 52 of the piston body 38. The anti-rotation features 66 generally oppose one another. Stated another way, the anti-rotation features 66 are located on opposite sides of the piston seal 44. The anti-rotation features 66 are generally flat sections relative to the generally annular structure of the piston seal 44.

The thrust bearing assembly 46 comprises a thrust bearing 68 that is supported in a cage 70. The cage 70 comprises a hanger 72 for engaging the caliper body 12 and securing the thrust bearing assembly 46 to the caliper body 12 to prevent the cage 70 from rotating or otherwise moving. The thrust bearing 68 comprises an input portion 74 through which the input portion 64 of the spindle 42 is received. The spindle O-ring 48 comprises an input portion 76 that is adapted to receive the input portion 64 of the spindle 42. The retaining clip 50 is adapted to surround at least a portion of the input portion 64 of the spindle 42 and restrict or prevent the spindle 42 from axially moving along the longitudinal axis 40 when the brake assembly 10 is assembled. A piston boot 78 is adapted to surround the piston body 38.

Figure 4:
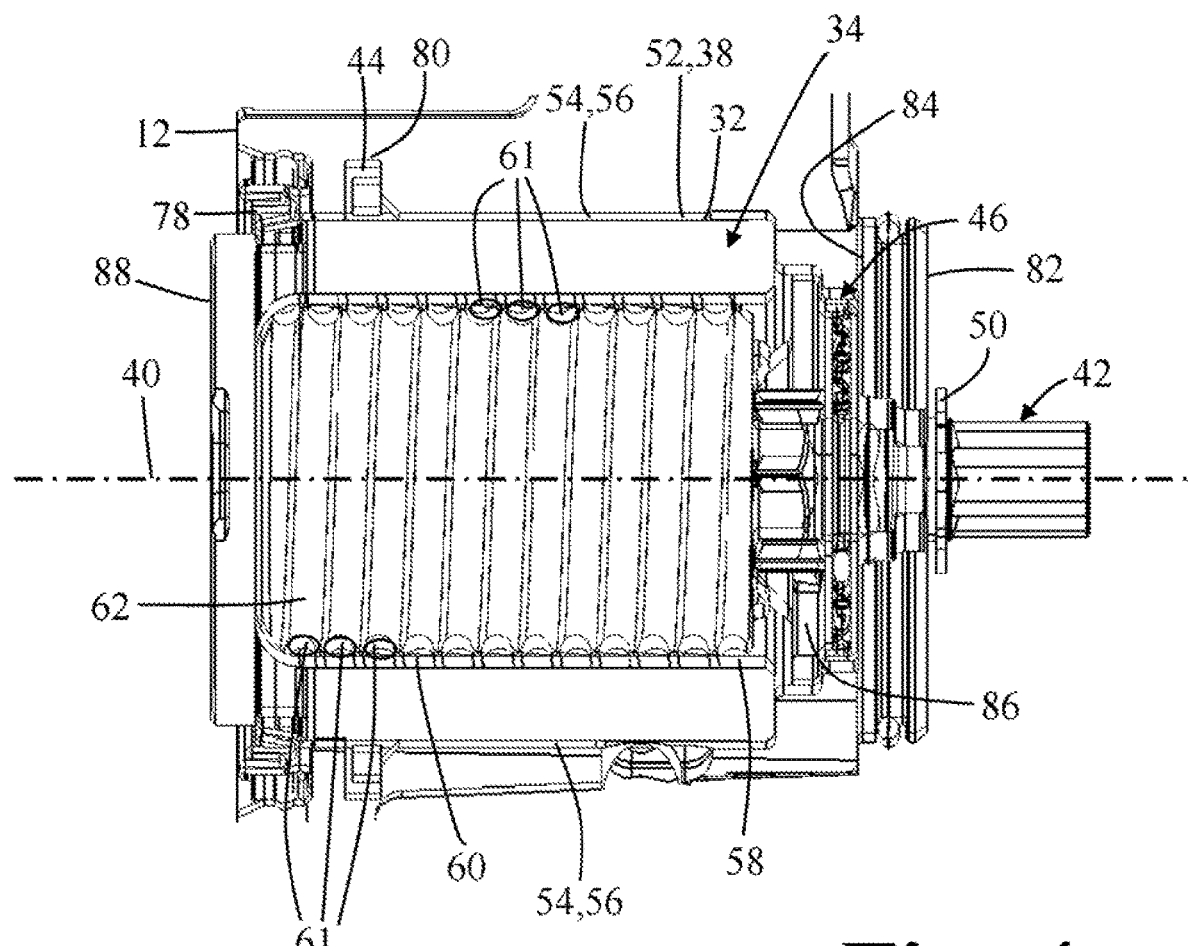
FIG. 4 is a close-up, cross-sectional view of the brake piston.

FIG. 4 is a cross-sectional view of the brake piston 34 that is supported in the caliper bore 32 of the caliper body 12. The piston seal 44 surrounds the outer surface 52 of the piston body 38 is supported in a recess 80 defined in the caliper body 12. The piston boot 78 is adapted to surround the piston body 38. The threaded portion 62 of the spindle 42 is adapted to threadably engage the threaded portion 60 of the piston pocket 58 so that when the spindle 42 is rotated by torque output from the MGU 20 (FIGS. 1 and 2), the brake piston 34 moves axially along the axis 40 in an apply or release direction towards or away from the inboard brake pad. One or more ball bearings or rollers 61 may be located in grooves, channels, or races defined by the corresponding threaded portions 60, 62 so that the spindle 42 and the piston body 38 function like a high-efficiency rotary to linear motion mechanism, for example a ball screw. However, in some configurations, the system may be free of any ball bearings or rollers located in grooves, channels, or races defined by the corresponding threaded portions 60, 62. In such configurations, the spindle 42 and the piston body 38 may function like a low-efficiency rotary to linear motion mechanism, for example a lead screw.

The outer surface 52 of the piston body 38 comprises anti-rotation features 54 that are engaged by corresponding anti-rotation features 56 defined in the caliper bore 32 of the caliper body 12. The anti-rotation features 54, 56 cooperate to restrict or prevent the brake piston 34 from rotating about the axis 40 when the spindle 42 is rotated.

The retaining clip 50 is positioned at an outer surface 82 of the caliper body 12 and is adapted to restrain the spindle 42 from moving axially along the longitudinal axis 40. The thrust bearing assembly 46 is sandwiched between an inside surface 84 of the caliper body 12 and a flange 86 of the spindle 42.

A method of assembling the brake system 10 and/or the brake piston 34 will now be described with reference to the foregoing figures. It is understood that the following steps can be performed in virtually any order. Moreover, one or more of the following steps can be combined; omitted or eliminated; repeated; or separated into additional, individual or discrete steps. In the interest of brevity, the following steps are described for assembling one brake piston 34 and brake system 10. A brake system 10 that includes more than one brake piston 34 can be assembled in virtually the same manner by repeating one or more of these steps.

The method of assembling the brake system 10 and/or the brake piston 34 (hereafter "method of assembling") includes a step of inserting the spindle 42 into the piston pocket 58 and threadably engaging the threaded portion 62 of the spindle 42 with the threaded portion 60 of the brake piston 34 or piston body 38. The method of assembling includes a step of attaching or sliding the generally annular piston seal 44 onto or over the outer surface 52 of the brake piston 34 or piston body 38 such that the anti-rotation feature 66 or flat sections of the piston seal 44 engage or contact the anti-rotation feature 54 or flat sections of the brake piston 34 or piston body 38. The method of assembling includes a step of assembling or sliding the input portion 74 of the thrust bearing assembly 46 onto the input portion 64 of the spindle 42. The method of assembling includes a step of assembling or sliding the input portion 76 of the O-ring onto the input portion 64 of the spindle 42 until the O-ring contacts or touches the thrust bearing cage 70 or thrust bearing assembly 46. The method of assembling includes a step of assembling or sliding the piston boot 78 onto an outer surface 52 of the brake piston 34 or piston body 38. The method of assembling includes a step of inserting the brake piston 34 into the caliper bore 32 of a caliper body 12 such that the thrust bearing assembly 46 is sandwiched between an inner surface 84 of the caliper body 12 and the flange 86 of the spindle 42. The method of assembling includes a step of attaching the clip 50 to the input portion of the spindle 42 as it projects outside of the caliper body 12 so that the clip 50 prevents axial movement of the spindle 42 relative to the axis 40.

Operation of the brake system 10 to create the clamping force will now be described in the following steps with reference to the foregoing figures. It is understood that the following method steps can be performed in virtually any order. Moreover, one or more of the following method steps can be combined; omitted or eliminated; repeated; or separated into additional individual steps.

Creating clamping force includes a step of activating the brake system 10. This step may be performed manually by depressing a brake pedal or pushing or activating a button or lever. This step may be performed automatically, for example, when a vehicle is put into a "Park" gear or an engine or motor is turned OFF. Creating clamping force includes a step of transmitting a signal from the controller 36 to the MGU 20 after the system 10 is activated. Creating clamping force includes a step of transmitting or supplying, the MGU 20 or motor with a current, a voltage, power, a signal, or a combination thereof to begin generating torque. The torque generated by the motor or MGU 20 may be transmitted to or through one or more gears or a gear stage to increase or decrease the torque output. Creating clamping force includes a step of supplying the torque to the input portion 64 of the spindle 42 so that the spindle 42 is rotated about the axis 40 in an apply direction. The apply direction may be clockwise or counter-clockwise. Rotating of the spindle 42 in the apply direction causes the piston body 38 to move axially along the axis 40 towards the corresponding brake pad 22, 24. That is, a brake piston 32 located at the inboard side of the caliper body 12 will be moved towards the inboard brake pad 22 and a brake piston 32 located at the outboard side of the caliper body 12 will be moved towards the outboard brake piston 24. During this axial movement of the brake piston 32 along axis 40, the brake piston 34 or piston body 36 is restricted or prevented from rotating about the axis 40 by way of the anti-rotation features 54 or flat sections of the piston body 38 engaging the corresponding anti-rotation features 56 or that sections of the caliper bore 32. Also, the piston seal 44 and its corresponding anti-rotation features 66 or flat sections engaging the corresponding anti-rotation features 54 or flat sections of the caliper body 38 and the inner portion of the caliper bore 58 restricts or prevents rotation of the caliper body 38 or brake piston 34, while also maintaining parallelism of the piston body 38 within the caliper bore 32.

The brake piston 34 or piston body 38 is moved until the front end 88 of the brake piston 34 contacts the pressure plate of the corresponding brake pad 22, 24. After contact is made, continued rotation of the spindle 42 and thus movement of the brake piston 34 or piston body 38 in the apply direction causes the corresponding brake pad 22, 24 to be moved in the apply direction until the corresponding friction material of the brake pad 22, 24 is pressed into contact with the brake rotor 26 or other moveable member. The brake pad 22, 24 is pressed into contact with the brake rotor 26 until a sufficient clamping force is achieved.

Operation of the brake system 10 to release the clamping force will now be described in the following steps with reference to the foregoing figures. Again, it is understood that the following steps can be performed in virtually any order. Moreover, one or more of the following steps can be combined; omitted or eliminated; or separated into additional individual steps.

Releasing clamping force includes a step of activating the brake system 10. This step may be performed manually by releasing a brake pedal or pushing or activating a button or lever. This step may be performed automatically, for example, when a vehicle is put into a "Drive" gear or an engine or motor is turned ON. Releasing clamping force includes a step of transmitting a signal from the controller 36 to the MGU 20 after the system 10 is activated Releasing clamping force includes a step of transmitting or supplying the MGU 20 or motor with a current, a voltage, power, a signal, or a combination thereof to begin generating torque. The torque generated by the motor or MGU 20 may be transmitted to or through one or more gears or a gear reduction stage to increase or decrease the torque output. Releasing clamping force includes a step of supplying the torque to the input portion 64 of the spindle 42 so that the spindle 42 is rotated about the axis 40 in a release direction. The release direction is opposite the direction that the spindle 42 is rotated during creation of the clamping force. The release direction may be clockwise or counter-clockwise. Rotating of the spindle 42 in the release direction causes the piston body 38 to move axially along the axis 40 away from the corresponding brake pad 22, 24. That is, a brake piston 32 located at the inboard side of the caliper body 12 will be moved away from the inboard brake pad 22 and a brake piston 32 located at the outboard side of the caliper body 12 will be moved away from the outboard brake piston 24. During this axial movement of the brake piston 32 along axis 40, the brake piston 34 or piston body 38 is restricted or prevented from rotating about the axis 40 by way of the anti-rotation features 54 or flat sections of the piston body 38 engaging the corresponding anti-rotation features 56 or flat sections of the caliper bore 32. Also, the piston seal 44 and its corresponding anti-rotation features 66 or flat sections engaging the corresponding anti-rotation features 54 or flat sections of the caliper body 38 and the inner portion of the caliper bore 58 restricts or prevents rotation of the caliper body 38 or brake piston 34, while also maintaining parallelism of the piston body 38 within the caliper bore 32.

The brake piston 34 or piston body 38 is moved until the front end 88 of the brake piston 34 disengages or is no longer in contact with the pressure plate of the corresponding brake pad 22, 24. The brake pads 22, 24 may then move away from a corresponding side of the brake rotor 26.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, single element or step might be divided into separate plural elements or steps. The disclosure of "a" or "one" to describe an element or step is not intended to foreclose additional elements or steps. By use of the term. "may" herein, it is intended that any described attributes that "may" be included are optional.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A brake system comprising:
   a brake piston having an anti-rotation feature, the brake piston further including a piston pocket with a threaded portion defined in a side wall thereof, wherein the brake piston is supported in a caliper bore of a brake caliper and the caliper bore engages the anti-rotation feature of the brake piston to restrict or prevent the brake piston from rotating within the caliper bore;
   a spindle comprising a threaded portion; and
   a piston seal having a generally annular structure that includes an anti-rotation feature disposed on an inner diameter thereof that correspond to the anti-rotation feature of the brake piston;
   wherein the threaded portion of the spindle is adapted to threadably engage the threaded portion of the piston pocket.

2. The brake caliper according to claim 1, wherein the anti-rotation feature of the brake piston is located along a generally circular outer surface of the brake piston, and the anti-rotation feature of the brake piston is a generally flat section.

3. The brake caliper according to claim 2, wherein the brake piston comprises two anti-rotation features.

4. The brake caliper according to claim 3, wherein the two anti-rotation features of the brake piston generally oppose each other.

5. The brake system according to claim 1, wherein the brake system is free of a nut provided between the spindle and the brake piston.

6. The brake system according to claim 1, wherein the piston seal comprises two anti-rotation features and the brake piston comprises two anti-rotation features.

7. The brake system according to claim 1, wherein one or more ball bearings are provided in grooves defined by the threaded portion of the of the piston pocket and the threaded portion of the spindle.

8. The brake system according to claim 1, wherein the brake caliper comprises more than one caliper bore, and each of the more than one caliper bore is adapted to support one of the brake pistons.

9. The brake system according to claim 8, wherein all of the caliper bores are located on one side of the brake caliper.

10. A method of assembling the brake system according to claim 1, wherein the method comprises a step of:
    inserting the spindle into the piston pocket and directly or indirectly threadably engaging the threaded portion of the spindle with the threaded portion of the brake piston.

11. The method according to claim 10, wherein the method comprises a step of:
    attaching the piston seal to outer surface of the brake piston such that the anti-rotation feature of the piston seal engages the anti-rotation feature of the brake piston.

12. The method according to claim 10, wherein the method includes a step of:
    inserting the brake piston into the caliper bore of the brake caliper.

13. A brake system comprising:
    a brake piston having an anti-rotation feature on an outer surface, the brake piston comprising a piston pocket having a threaded portion;

a spindle comprising a threaded portion, adapted to engage the threaded portion of the piston pocket;

a piston seal having an anti-rotation feature disposed on an inner diameter thereof that corresponds to the anti-rotation feature of the brake piston; and one or more ball bearings provided in grooves defined by the threaded portion of the piston pocket and the threaded portion of the spindle;

wherein the brake piston is positioned in a caliper bore of a brake caliper, and the caliper bore engages the anti-rotation feature of the brake piston.

14. The brake system according to claim 13, wherein the brake system comprises a motor, wherein the motor is in communication with the spindle and configured to rotate the spindle, and wherein rotation of the spindle causers the brake piston to move axially.

15. The brake system according to claim 14, wherein the brake system comprises a brake pad, and the brake piston is configured to directly contact the brake pad.

16. The brake system according to claim 13, wherein the brake system comprises a brake pad, and the brake piston is configured to directly contact the brake pad.

17. The brake system according to claim 14, wherein the piston seal surrounds the outer surface of the brake piston and the anti-rotation feature of the piston seal is adapted to engage the anti-rotation feature of the brake piston to restrict or prevent the brake piston from rotating.

* * * * *